E. SCHILLER.
DOUGH TREATING DEVICE.
APPLICATION FILED FEB. 2, 1918.

1,304,104.

Patented May 20, 1919.
7 SHEETS—SHEET 6.

INVENTOR
Eugene Schiller
BY
Howard Brennan
his ATTORNEY

UNITED STATES PATENT OFFICE.

EUGENE SCHILLER, OF DETROIT, MICHIGAN.

DOUGH-TREATING DEVICE.

1,304,104.　　　　　Specification of Letters Patent.　　Patented May 20, 1919.

Application filed February 2, 1918. Serial No. 215,060.

*To all whom it may concern:*

Be it known that I, EUGENE SCHILLER, a citizen of the United States, residing in the city of Detroit, county of Wayne, and State of Michigan, have invented certain new and useful Improvements in Dough-Treating Devices, of which the following is a full, clear, and exact specification.

My invention relates to dough handling devices and refers particularly to devices suitable for cutting and delivering dough strips, rods, tubes, etc.

One object of my invention is mechanical means for cutting dough into predetermined lengths.

Another object of my invention is mechanical means for delivering and removing dough strips, rods, tubes, etc.

Another object of my invention is a device in which the dough may be taken from the press and delivered in sheets of predetermined length.

Another object of my invention is a device in which dough from a press is spread, cut and delivered by mechanical means.

Another object of my invention is a device in which the dough is automatically cut and delivered.

Another object of my invention is a device in which the dough during its passage or movement determines the cutting period and automatically causes the dough to be removed and delivered upon bars at any predetermined distance from the device.

Another object of my invention is a device in which the handling of dough from its receipt from the press to its delivering at the drying chamber, including spreading and cutting, is accomplished entirely by automatic mechanical means.

In the manufacture of many products from dough, it is essential that it be obtained in practically even rods, strips, etc., cut into predetermined lengths, and hung up to dry.

The methods employed for the accomplishment of these results usually comprise a large amount of manual manipulation, the dough being cut by hand, removed by means of bars and manually carried to the place of drying. This causes a considerable expenditure of time, labor and money, and the results are unsatisfactory, considerable loss being occasioned by the breaking or tearing of the dough.

The device of my invention accomplishes all of the desired results without personal manipulation of the dough, the device receiving the dough from a press, spreading it evenly, cutting it into predetermined lengths, and transferring the cut lengths to a desired place for future treatment without being handled by the workman. In addition to the above advantages, the process is a continuous one, being uninterrupted, the dough being cut and delivered as rapidly as it is fed into the device from a press.

The device of my invention is therefore economical, rapid, positive and hygienic in its action.

In the accompanying drawings illustrating one form of the device of my invention, similar parts are designated by similar numerals.

The particular form of my device illustrated in the accompanying drawings comprises the die support 20 and the feeding chute 21, the dough being forced in the form of a strip, rod or tube down the chute formed by the side members 22, 22, 23, 23, 23^A, 23^A, 24, 24 and the bottom members 25, 26, 26^A and 27 supported upon the frame members 28, 28. For clearness the portion of the chute 22, 22, 25 will be called A, the chute 23, 23, 26 will be called B, the chute 23^A, 23ᴬ, 26ᴬ will be called C and the chute 24, 24, 27 will be called D. The annular sleeve 29 carrying the pulley wheel 30, connected to a source of revoluble power, is revoluble around the shaft 31, within the bearings 32, 32. The annular sleeve 29 has an undulating cam path 33, the undulated portions of which are abuttable upon the revoluble wheel 34 carried by the member 35 which is fixedly attached to the rock shaft 36 carried by the bearings 37, 37 of the frame 38, 38. Fixedly attached to the rock shaft 36 are the arms 39, 39. The bars 40, 40 are pivotally attached to the arms 39, 39 and to the connecting members 41, 41, the latter being attached to one end of the shafts 42, 42 capable of slidable movement.

The spring 43, bearing between the collar 44 of the shaft 42 and the frame, keeps the wheel 34 in abutment with the undulations within the cam path 33 and also tend to give a springing movement to the pan. The shafts 42, 42 are attached by means of the members 47, 47 to the bottom 25 of the portion A of the dough chute, the operation of the device being to give this portion of the chute a rapid side-to-side or jogging movement, thus causing the dough to be comparatively evenly distributed over the bottom of the chute.

The dough cutting mechanism comprises a cam 50 fixedly attached to the shaft 31. A split arm 51 straddling the shaft 31 and carrying the wheel 52 abuttable upon the cam 50, is pivotally attached to the link 53, the latter being fixedly attached to the rock shaft 54 carried by the frame 28. The link 53 is pivotally attached to the link 55. The rock shaft 54 has fixedly attached, near its other extremity, the link 53′ corresponding to the link 53, the link 53′ being pivotally attached to the link 55′ corresponding to the link 55, so that the links 55 and 55′ move in unison with the movement of the arm 51. A spiral spring 56 connected to the lower portion of the split arm 51 and the foundation frame 57 causes the wheel 52 of the arm 51 to abut upon the cam 50. Channeled uprights 60, 60 are situated at each side of the dough chute. Slidable within each channel is an upright 61, the two uprights 61, 61 carrying a cross-beam 62. The set screws 63, 63 may be employed to take up any wear caused by the movement of an upright 61 within the channel of the upright 60. The cross-bar 62 contains two chambers 64, 64 within each of which is the hollow member 65, and within the member 65 is the slidable member 66 with a spiral spring 67′ between the upper head of the member 66 and the interior face of the member 65. The lower ends of the members 66, 66 are attached to a knife blade 67 by means of the threaded bolts 68, 68, the threaded bolts passing through elongated slots in the cutter, in order to allow a slight upward movement of the cutter and prevent its edge from abutting forcibly upon the bottom of chute B. The arms 55, 55′ are pivotally attached to the uprights 61, 61.

The operation of the dough cutting device is as follows:

The revolution of the cam 50 causes the member 51 to rise and fall, operating the link movements 53 and 55, the movement of the latter causing the knife blade 67 to rise and fall, the downward movement of the knife blade cutting dough within the chute portion B, the spring 67′ relieving the blow of the knife blade 67 upon the bottom 26.

The opening and closing of the member 70 of the dough chute, for purposes to be described later, is accomplished as follows:—

A cam 71 is fixedly attached to the shaft 31. Abutting upon the cam 71 is the wheel 72 carried by the arm 73 fixedly attached to the rock shaft 74. The other end of the arm 73 is pivotally attached to the arm 75. Fixedly attached to the rock shaft 74 is the arm 73′ pivotally attached to the arm 75′. The arms 75 and 75′ are attached to the chute member 70. The spring 76 fastened to the arm 73 and the frame 28, causes the wheel 72 to abut upon the cam 71.

The operation of this portion of the device is as follows:—

The revolution of the cam 71 causes the rocking of the shaft 74 through the medium of the arm 73 and wheel 72 and the movement of the shaft 74, through the arms 75, 75′ causes the chute member 70 to slide back and forth, thus opening and closing the dough chute at this point.

Near one extremity of the chute portion D is a slidable member 80, held in its normal position by the springs 81, 81 abutting upon the member 80 and the fixed members 82, 82. The member 80 carries an extended member 83, slidable through an opening in one of the members 82 and capable of insertion between the two plates 84, 85 connected with the two wires 86, 87, the plates 84, 85 being held in insulation by the insulating member 88. The wire 87 carries the manually manipulated switch 89 and is connected with the battery 90 which in turn is connected with the solenoid 91. The wire 86 is also connected with the solenoid 91 which carries the slidable core 92. The connection between the member 83 and the plates 84 and 85 energizes the solenoid 91 drawing the core 92 inwardly thereof. Fixedly attached to the shaft 31 is the annular member 93, within which is a segmental rotatable member 94, capable of insertion within the recesses 95, 95, 95 of the rotatable sleeve 29, locking together the two members 93 and 29. Fixedly attached to the rotatable member 94 is the member 96, having the arm 97 carrying the arm 98 abuttable upon the core 92, and the arm 99 capable of abutment upon the stop member 100. The spring 101 connected to the member 102, fixedly attached to the rotatable member 94 and the member 93, tends in its normal position to revolve the member 94 into a locked position with the sleeve 29 and the member 93, this locked position being overcome by the abutment of the arm 98 upon the core 92 retaining the sleeve 29 in a condition whereby it may be revolved without the revolution of the member 93 and the shaft 31. The operation of this portion of the device is as follows:—

Figure 1:
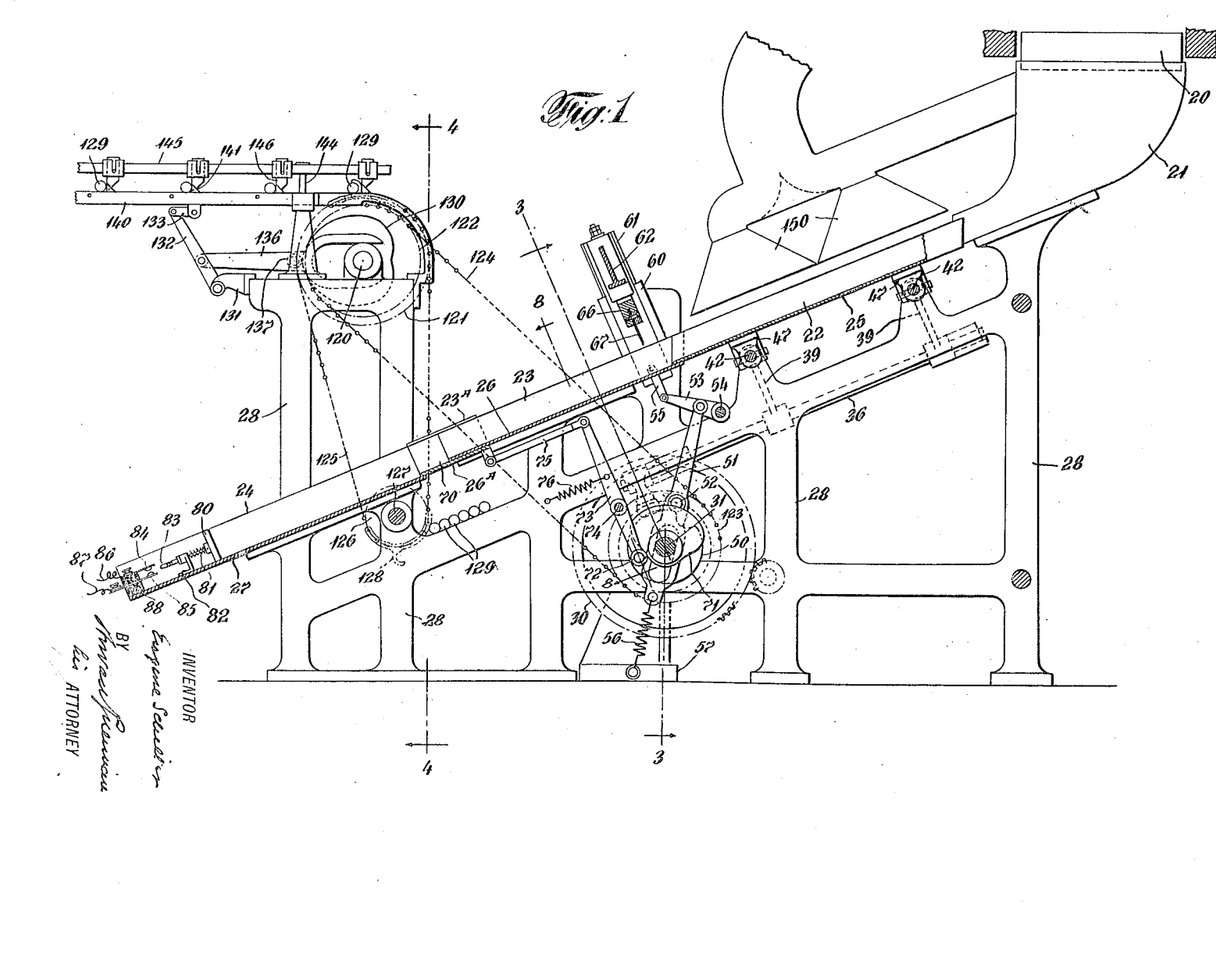
Figure 1 is a longitudinal cross-section of one form of my device.
Figure 2:
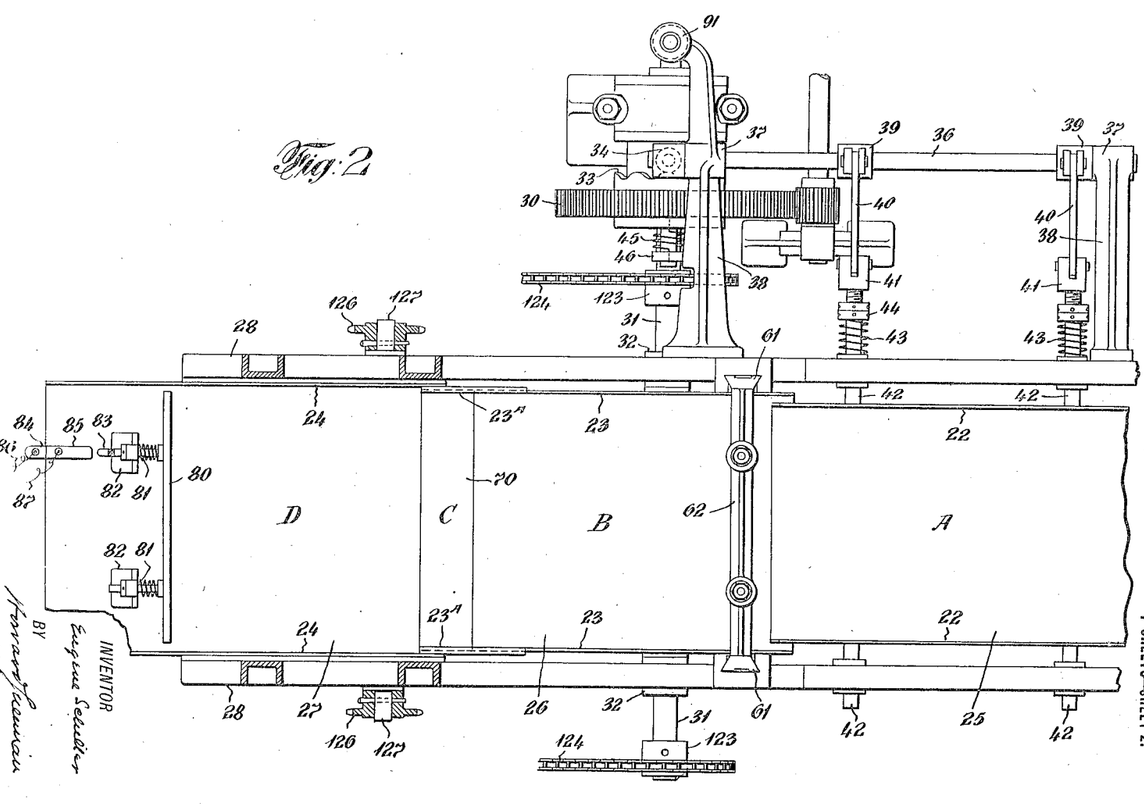
Fig. 2 is a top plan view partly in cross-section.
Figure 3:
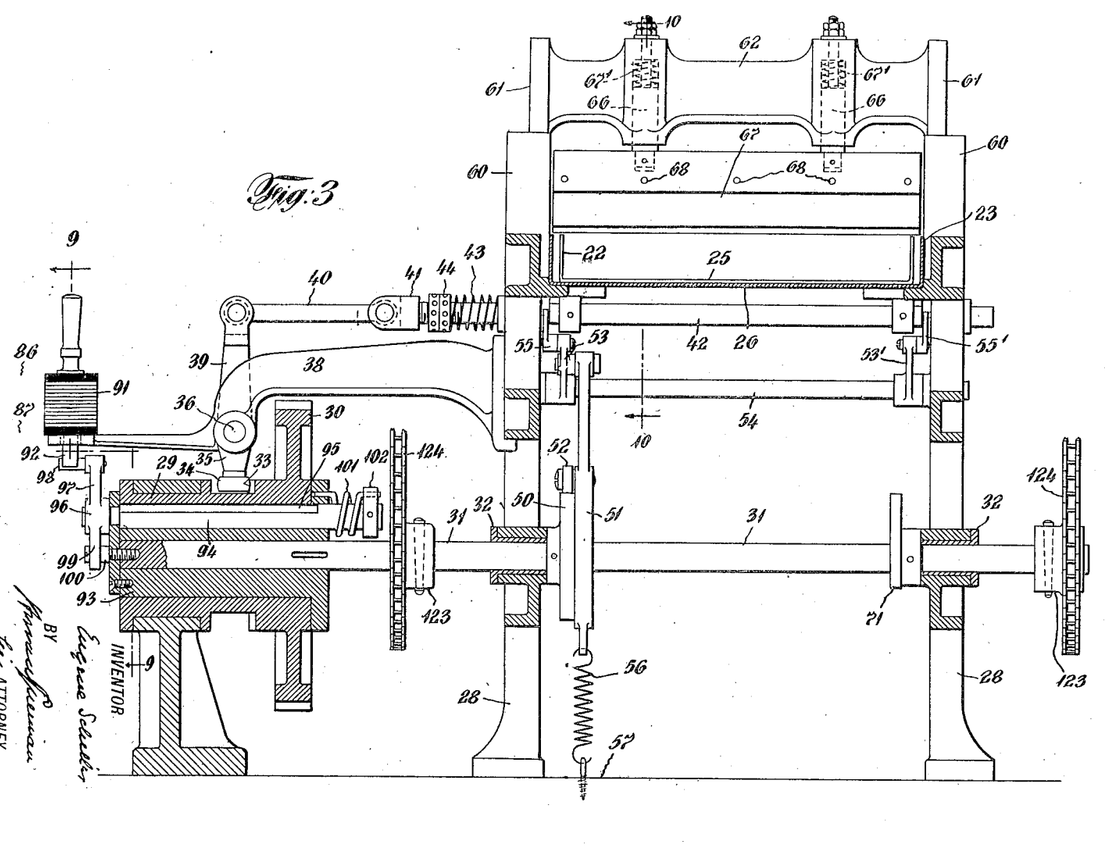
Fig. 3 is a cross-section on the line 3—3 of Fig. 1.
Figure 4:
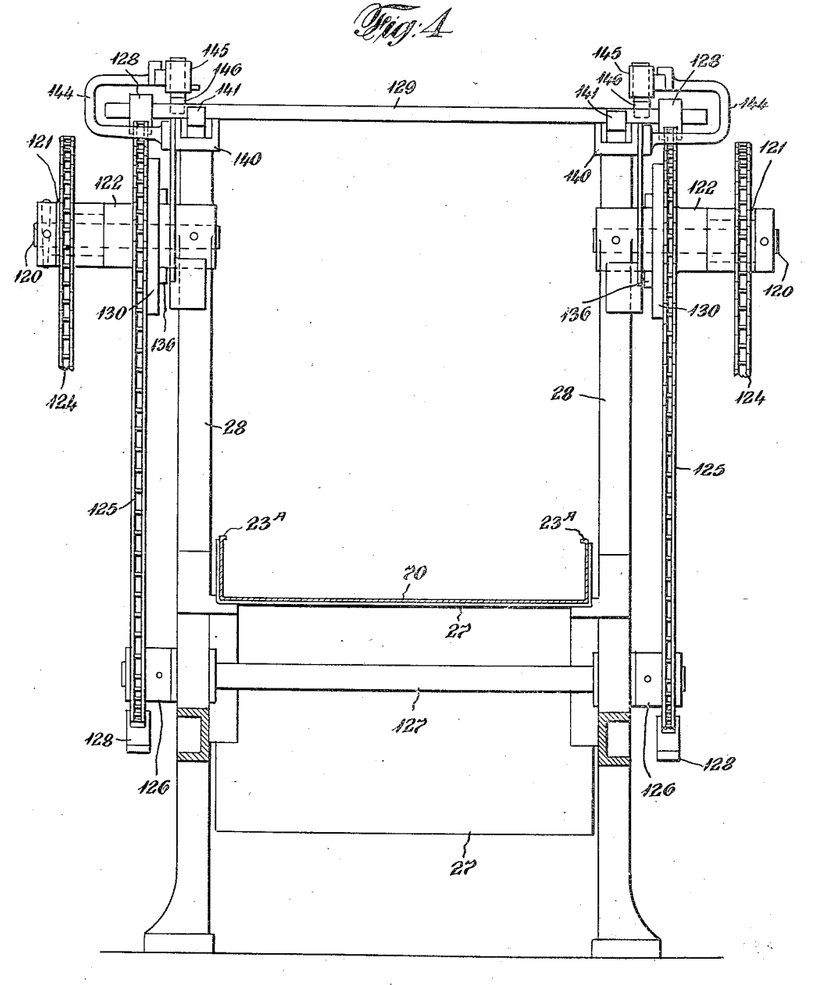
Fig. 4 is a cross-section on the line 4—4 of Fig. 1.
Figure 5:
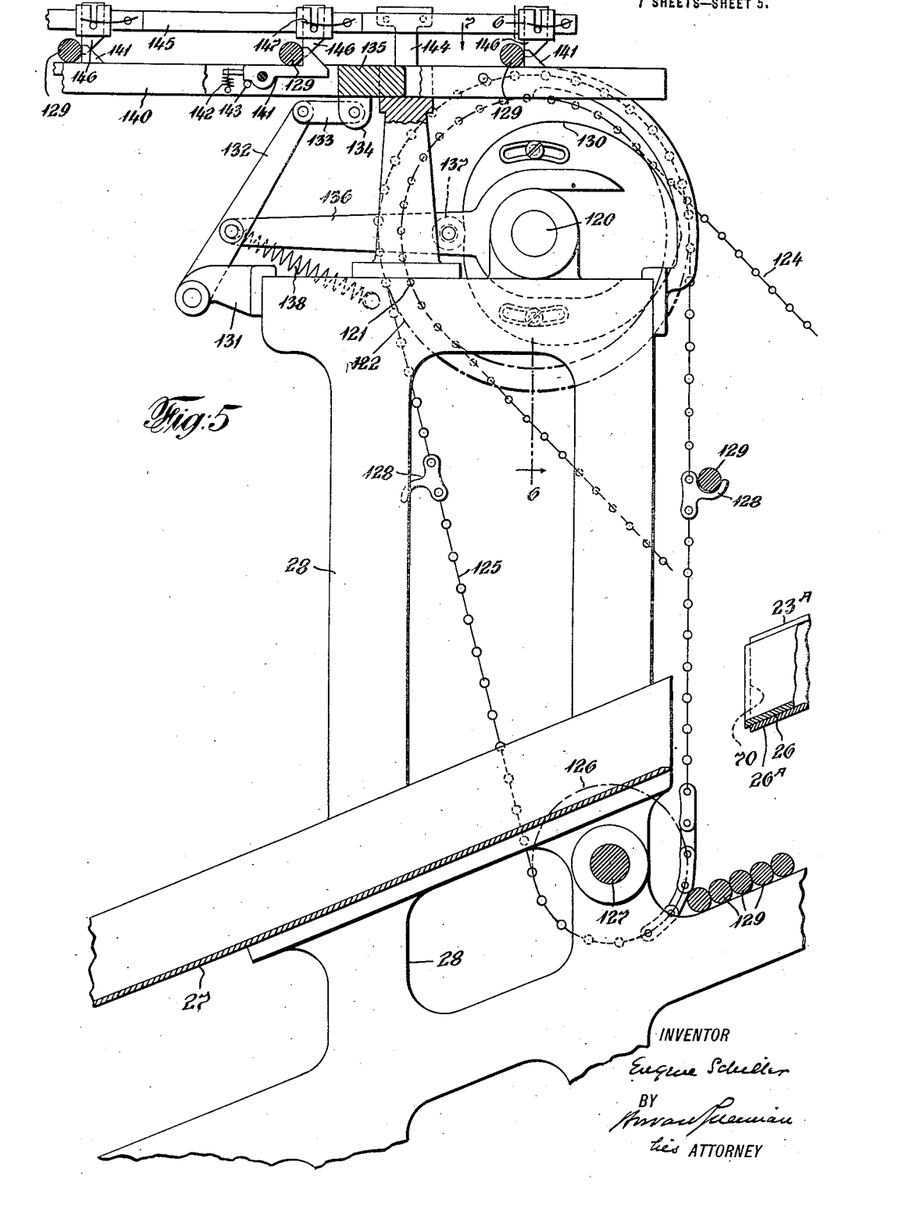
Fig. 5 is an enlarged fragmental view of the delivering end of Fig. 1, showing different states of operation, parts removed and broken away for clearness.
Figures 6, 7, 8:
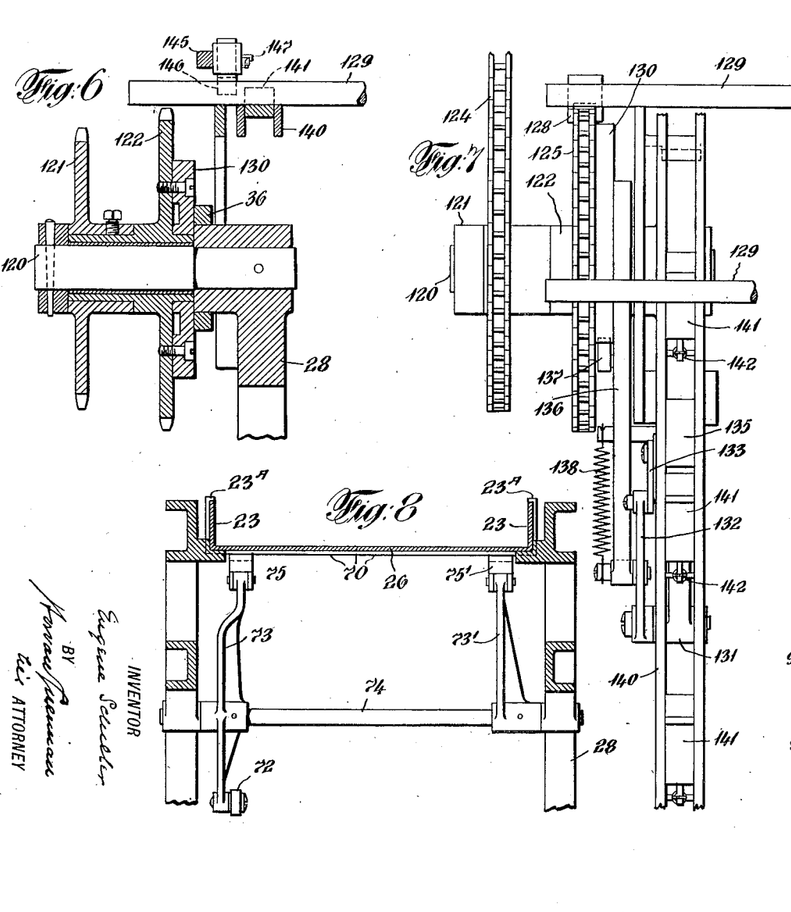
Fig. 6 is a cross-section on the line 6—6 of Fig. 5.
Fig. 7 is a plan view in the direction of the arrow 7 of Fig. 5, with parts removed for clearness.
Fig. 8 is a cross-section on the line 8—8 of Fig. 1.
Figure 9:
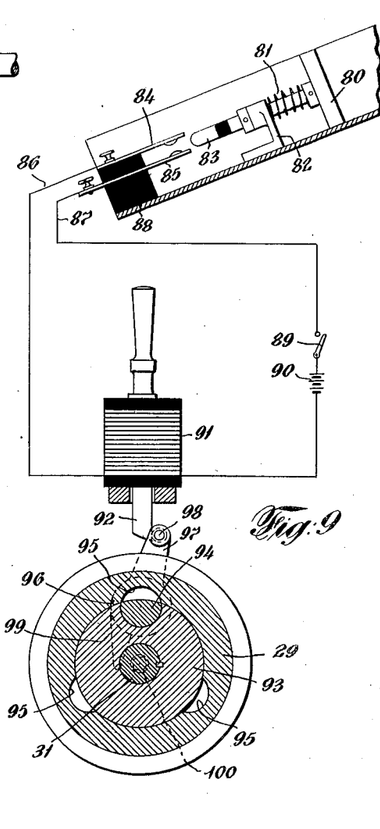
Fig. 9 is a cross-section through the line 9—9 of Fig. 3, showing the electric circuit.
Figures 10, 12:
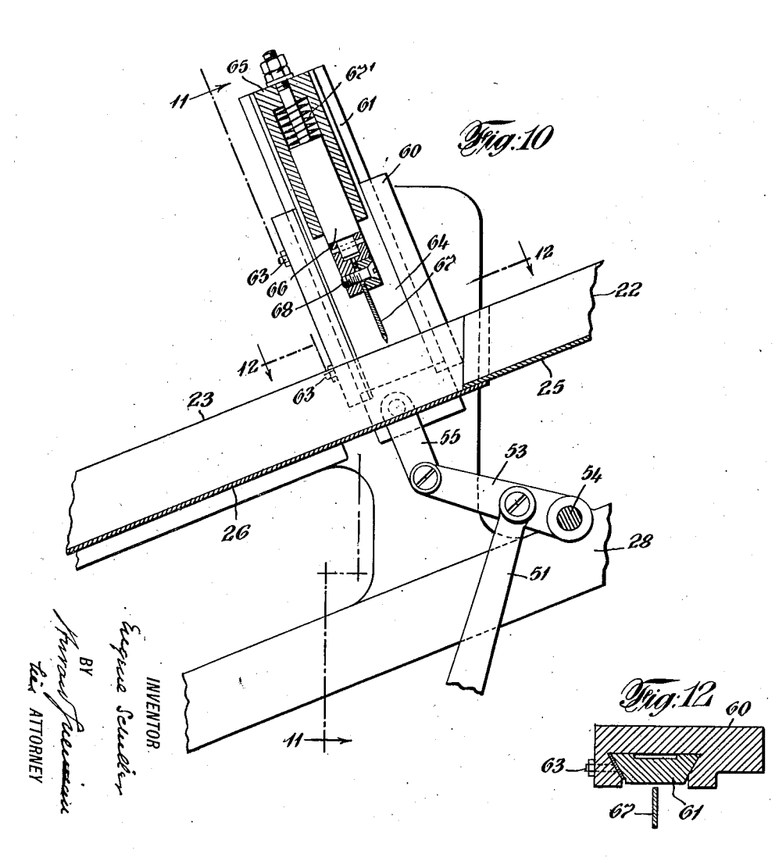
Fig. 10 is an enlarged cross-section on the line 10—10 of Fig. 3.
Fig. 12 is a cross-section on the line 12—12 of Fig. 10.
Figure 11:
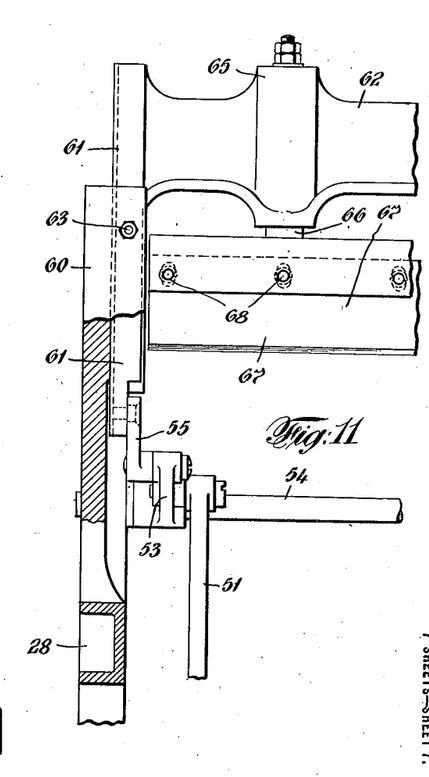
Fig. 11 is a cross-section on the line 11—11 of Fig. 10.

When the device is in the position shown in Fig. 9, the sleeve 29 will revolve, and the abutment of the arm 98 upon the core 92 will prevent the locking of the member 93 with the sleeve 29, the former remaining stationary during the revolution of the latter. When the member 80 is moved, the arm 83 connecting the circuit wires 86 and 87, the solenoid 91 will be energized, the core 92 will be withdrawn from abutment with the arm 98, the spring 101 will cause the segmental member 94 to rotate until the arm 99 abuts upon the stop 100, thus locking the sleeve 29 with the member 93 by the engagement of the segmental member 94 within one of the recesses 95, 95, causing the latter and the shaft 31 to revolve with the former. When the member 80 is moved outwardly again by means of the springs 81, 81, the electric connection will be interrupted, the core 92 will fall downwardly and the arm 98 will be brought against it by the revolution of the member 93, thus revolving the arm 96, and unlocking the member 93 and the shaft 31 from engagement with the revoluble sleeve 29. The making and breaking of the electric circuit will therefore cause the revolution or non-revolution of the shaft 31 during the continuous revolution of the sleeve 29.

The frame 28 carries the two revoluble stub shafts 120, 120, each carrying the two fixed sprocket wheels 121 and 122, each sprocket wheel 122 being connected to the sprocket wheel 123 fixedly attached to the shaft 31, by the link belt 124. The sprocket wheel 121 is connected by the link belt 125 to the sprocket wheel 126 fixedly attached to the revoluble shaft 127 carried by the frame 28. The belt 125 carries a series of fingers 128, 128, each capable of receiving one of a series of bars 129, 129 and of carrying it upwardly. Fxedly attached to each shaft 120 is a heart-shaped cam 130. Pivotally attached to an arm 131 on each side of the frame 28, is a link 132, pivotally attached to the link 133 which is pivotally attached to the extension 134 of the slidable member 135. The link 132 is pivotally attached to the finger arm 136 carrying the wheel 137 held in abutment against the cam 120 by means of the spring 138. The slidable member 135 comprises two parallel channel bars 140, 140, carrying a series of pivotal pawls 141, 141, held in normal horizontal position by the springs 142, 142, and the stop pins 143, 143. Supported by the frame 28, by means of the brackets 144, 144, are the two parallel bars 145, 145 carrying a series of downwardly extended pawls 146, 146, capable of upward slidable movement, but held in their downward position normally by the springs 147, 147.

The operation of this portion of the device is as follows:—

The revolution of the shaft 31 causes a revolution of the shaft 120 through the medium of the link belt 124. This causes a revolution of the sprocket wheel 121 and the movement of the link belt 125. As each pair of fingers 128, 128 of the belt 125 pass around the sprocket wheel 126, they pick up a rod 129 and raise and carry it upwardly, depositing it upon the bars 140, 140, beyond a pair of pawls 141, 141, the bars 140, 140 having been moved in position to thus receive the bar 129 by means of the heart-shaped cam 130, and the link members 136, 132, 133 and 134. The movement of this portion of the device is then automatically interrupted during the period of non-revolubility of the shaft 31. When the shaft 31 again revolves, the bars 140, 140 move outwardly from the device, the pawl 141 carrying the bar 129 beyond the next pawl 146, the bars 140, 140 then return, the pawls 146, 146 holding the bar 129. By this means the bars 129, 129 are consecutively raised and passed along the bars 140, 140 to a position where they may be readily removed for drying or other treatment. The pipes 150, 150 convey a blast of dry or warm air upon the dough within the chute.

The operation of the entire device is as follows:—

Revoluble motion is given the wheel 30 and dough is delivered through 21 into the chute, which has a vibrating motion imparted by the mechanism described above, warm dry air being impinged upon the dough through the pipes 150, 150. During this portion of the process, the vibrating mechanism is the only portion of the device which is in operation. When the dough has passed downwardly through the chute, to the end thereof, its movement will move the member 80, making the electric circuit, energizing the solenoid, withdrawing the core 92 and revolving the shaft 31. This movement of the shaft 31 causes the knife blade 67 to move downwardly, cutting the dough, and at the same time the chute portion C will be withdrawn and a finger 128 of the belt 125 will pick up a bar 129, pass it upwardly through the opening made by the withdrawal of the chute C, and in its further upward movement carry the cut piece of dough and deposit the bar 129 and the dough upon the bars 140, 140. In the meantime, the knife blade 67 is moved upwardly, the chute C is closed and a new lot of dough has continued to pass down the chute, for a repetition of the above operations, all of the above movements being caused by a proper synchronism of the various elements of the device.

I do not limit myself to the particular size, shape, number or arrangement of parts as described and shown, all of which may be varied without going beyond the scope of my invention as described and claimed.

What I claim is:—

1. In a dough treating device, in combination, a dough chute, means for vibrating the chute, a knife blade, means for moving the knife blade to cut the dough into predetermined lengths, a bar transverse of and beneath the cut dough, means for moving the bar upwardly carrying the cut dough therewith and means for the continuous repetition of the cutting and removal of the dough.

2. In a dough treating device, in combination, a dough chute, means for vibrating the chute, a knife blade, means for moving the knife blade to cut the dough into predetermined lengths, a series of bars transverse of and beneath the chute, means for opening a portion of the chute to allow the passage of a bar therethrough, means for moving a bar through the opening in the chute carrying the cut dough therewith, means for closing the opening in the chute and means for maintaining the bar and cut dough exterior of the chute.

3. In a dough treating device, in combination, a dough chute, means for passing dough through the chute, means for making and breaking an electric circuit, means whereby the movement of the dough will make the circuit, means whereby the making of the circuit will cause the dough to be cut into a predetermined length, means for lifting the dough from within the chute and retaining it in its original forms and means whereby the removal of the dough from the chute will break the circuit.

4. In a dough treating device, in combination, a dough chute, means for passing dough through the chute, means for making and breaking an electric circuit, means whereby the movement of the dough will make the circuit, a knife blade, means whereby the making of the circuit will cause a movement to the knife cutting dough within the chute, means whereby the making of the circuit will cause the dough to be lifted from within the chute retaining the dough in its original form, means whereby the removal of the dough will break the circuit and means for continuously passing dough through the chute.

5. In a dough treating device, in combination, a dough chute, means for passing dough through the chute, means for making and breaking an electric circuit, means whereby the movement of the dough will make the circuit, a knife blade, means whereby the making of the circuit will cause a movement to the knife cutting dough within the chute, a series of movable bars below the dough, means whereby the making of the circuit will move a bar upwardly carrying the cut dough therewith and means whereby the removal of the dough from within the chute will break the circuit.

6. In a dough treating device, in combination, a dough chute, means for passing dough through the chute, means for making and breaking an electric circuit, means whereby the movement of the dough will make the circuit, a knife blade, means whereby the making of the circuit will cause a movement to the knife cutting dough within the chute, a series of movable bars below the chute, means whereby the making of the circuit will open a portion of the chute, means whereby the making of the circuit will cause a bar to pass through the opening of the chute, carrying the cut dough therewith, and means whereby the removal of the dough from within the chute will break the circuit closing the opening in the chute and maintaining the cut dough in a fixed position without the chute.

7. In a dough treating device, in combination, a dough chute, means for vibrating the chute, means for breaking and making an electric circuit, means whereby the movement of the dough will make the circuit, a knife, means whereby the making of the circuit will lower the knife cutting the dough, means whereby the making of the circuit will open a portion of the chute, a series of bars, means whereby the making of the circuit will cause a bar to pass upwardly through the opening carrying the cut dough therewith, means whereby the bar and dough thereon will be deposited upon a means for removing the dough to a point distant from the raising means, means whereby the removal of the dough from within the chute will break the circuit and means for continuously passing dough through the chute.

8. In a dough treating device, in combination, a dough chute, means for passing dough through the chute, a solenoid, means for energizing and deënergizing the solenoid, means whereby the dough will energize the solenoid, means whereby the energizing of the solenoid will cause the dough to be cut into a predetermined length, means for lifting the dough from within the chute and retaining it in its original forms and means whereby the removal of the dough will deënergize the solenoid.

9. In a dough treating device, in combination, a dough chute, means for passing dough through the chute, a solenoid, means for energizing and deënergizing the solenoid, means whereby the dough will energize the solenoid, a knife capable of cutting dough, means whereby the energizing of the solenoid will cut the dough, means for lifting the dough from within the chute and retaining it in its original forms and means whereby the removal of the dough will deënergize the solenoid.

10. In a dough treating device, in combination, a dough chute, means for passing dough through the chute, a solenoid, means for energizing and deënergizing the solenoid, means whereby the dough will energize the solenoid, a knife capable of cutting the dough, means whereby the energizing of the solenoid will cut the dough, means whereby the energizing of the solenoid will lift the dough from within the chute maintaining it in its original form and means whereby the removal of the dough will deënergize the solenoid.

11. In a dough treating machine, in combination, a dough chute, means for passing dough through the chute, a solenoid, means for energizing and deënergizing the solenoid, means whereby the dough will energize the solenoid, a knife capable of cutting the dough, means whereby the energizing of the solenoid will cut the dough, a series of bars below the dough, means whereby the energizing of the solenoid will cause a bar to carry the cut dough from within the chute, and means whereby the removal of the dough will deënergize the solenoid.

12. In a dough treating machine, in combination, a dough chute, means for passing dough through the chute, a solenoid, means for energizing and deënergizing the solenoid, means whereby the dough will energize the solenoid, a knife capable of cutting the dough, means whereby the energizing of the solenoid will cut the dough, a series of bars below the dough, means whereby the energizing of the solenoid will cause a bar to carry the cut dough from within the chute, means for maintaining the bar in a position in which the dough is free from the chute and means whereby the removal of the dough will deënergize the solenoid.

Signed at Saginaw, in the county of Saginaw and State of Michigan, this 25th day of January, 1918.

EUGENE SCHILLER.